Figure 18:
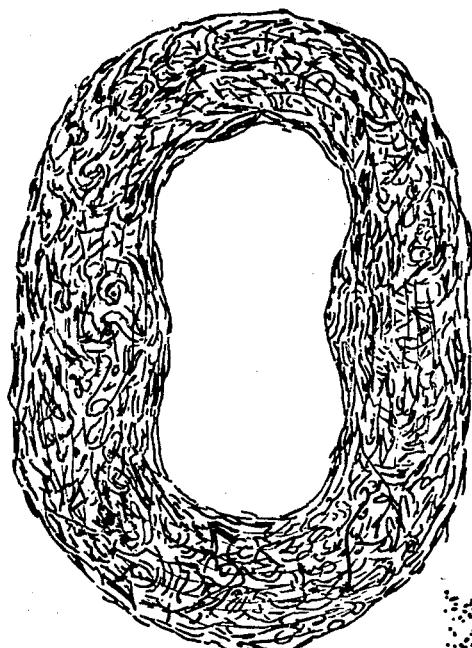

Oct. 27, 1964    W. GERHARDT    3,153,898
RINGSHAPED MEMBERS MADE FROM PLASTIC MATERIAL
Filed Jan. 8, 1963    5 Sheets-Sheet 1
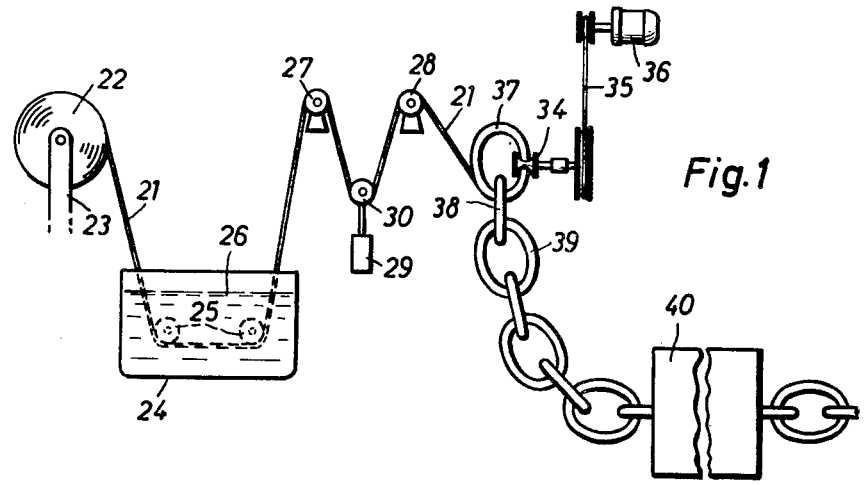
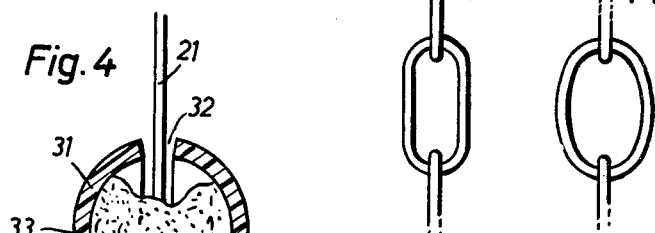
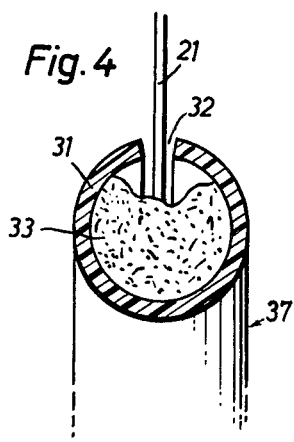
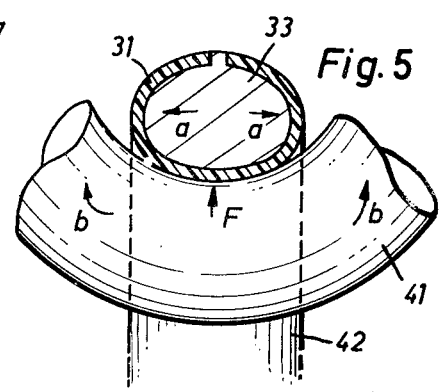
INVENTOR
WOLDEMAR GERHARDT
BY
Attorney

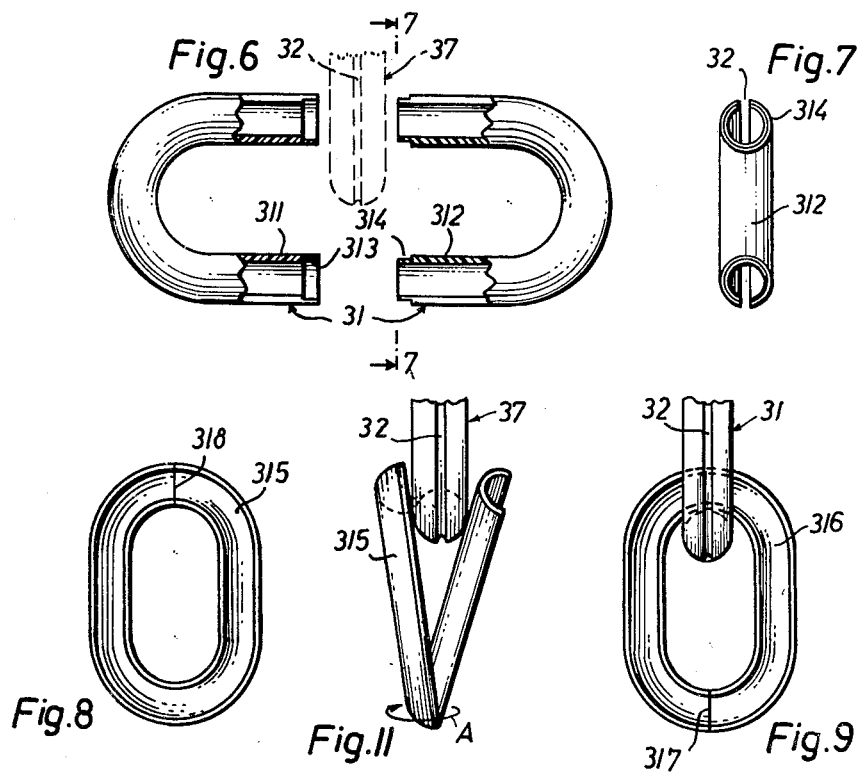
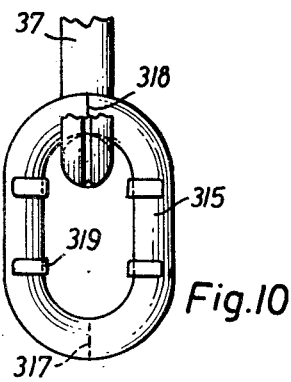

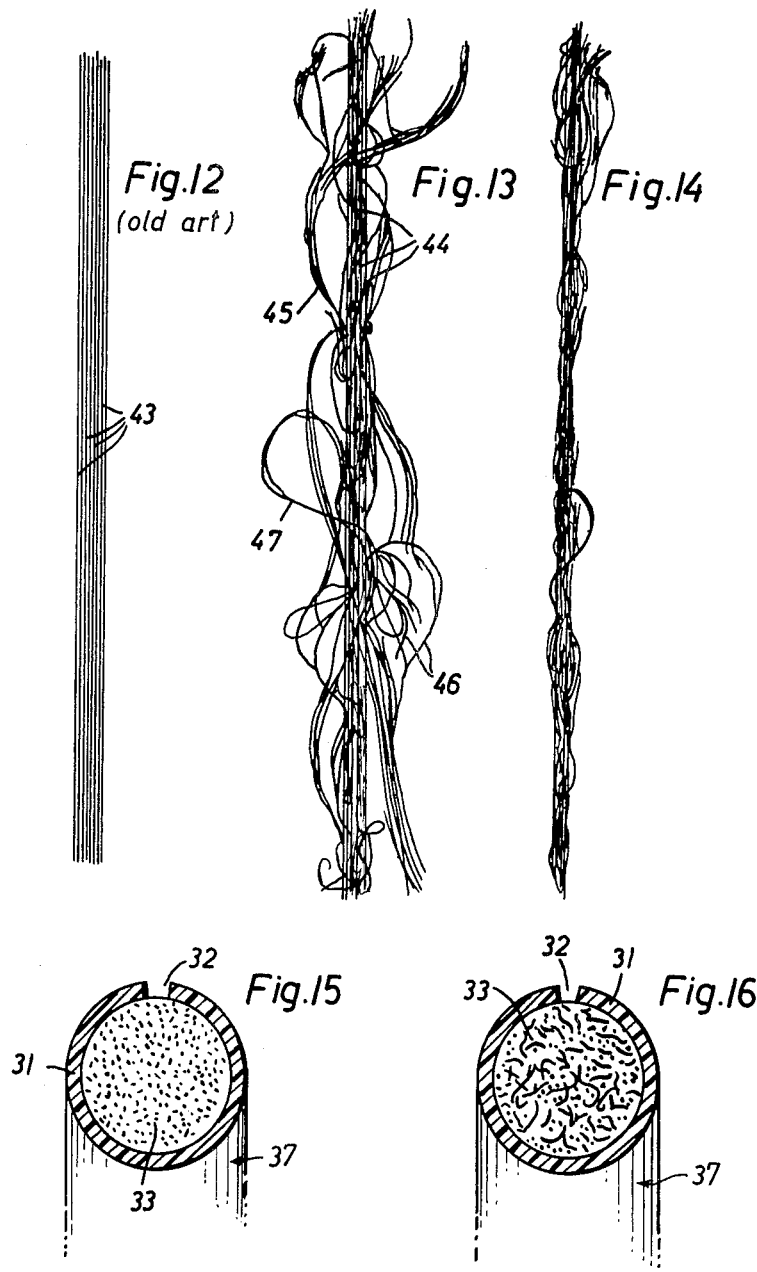

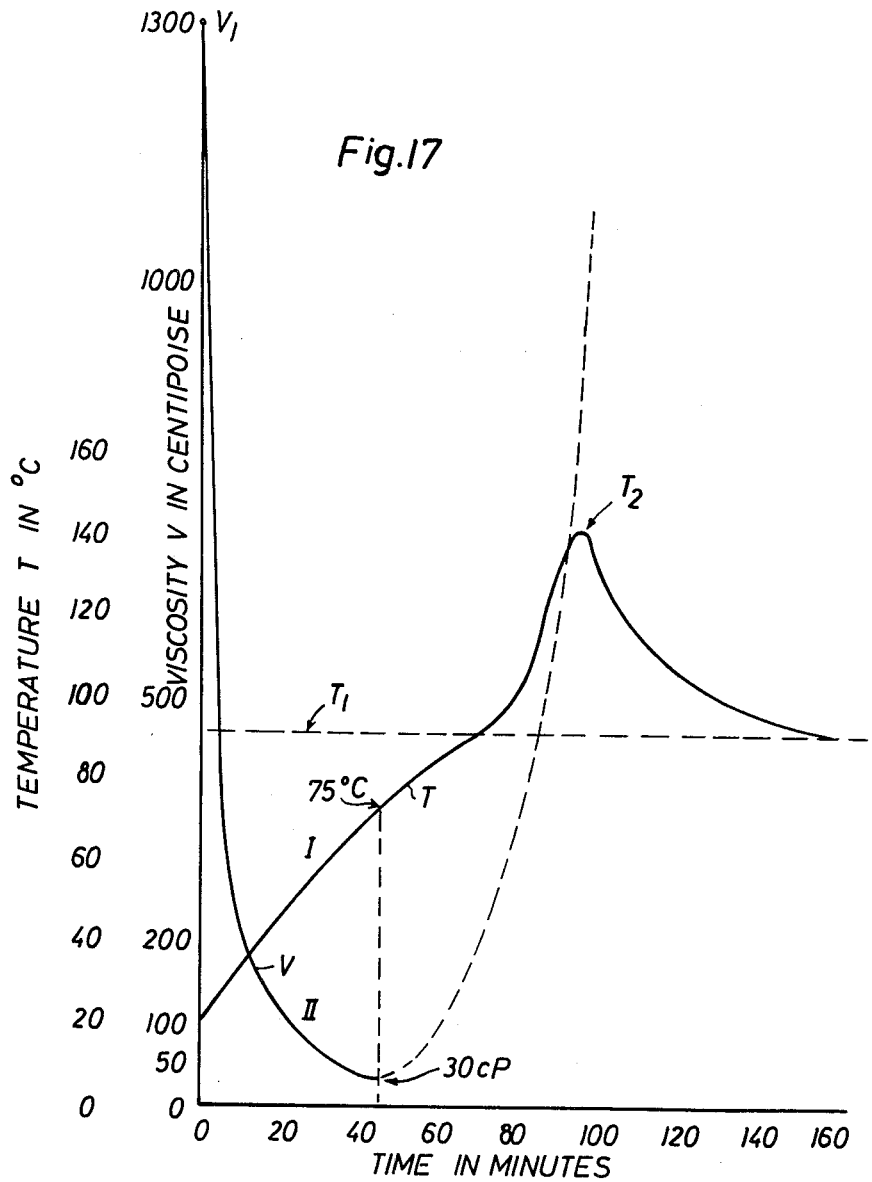

United States Patent Office 3,153,898
Patented Oct. 27, 1964

3,153,898
RINGSHAPED MEMBERS MADE FROM
PLASTIC MATERIAL
Woldemar Gerhardt, Dortmund-Aplerbeck, Germany, assignor to Kettenwerke Schlieper G.m.b.H., Grune, Westphalia, Germany, a corporation of Germany
Filed Jan. 8, 1963, Ser. No. 250,059
Claims priority, application Germany Feb. 19, 1962
3 Claims. (Cl. 59—84)

My invention relates to ringshaped members for use individually or as links in chains, and more particularly to ringshaped members made from synthetic plastic materials. Such members comprise a ringshaped hollow shell or jacket made of a synthetic plastic material and enclosed therein a strand or sliver of glass filaments impregnated with a viscous synthetic material which hardens when polymerized. To manufacture such ringshaped members the shell or jacket is provided with a circumferential slit through which the said strand, after being soaked in or impregnated with said hardenable viscous synthetic material, is introduced into the hollow of the shell or jacket to be wound thereinto until it completely fills the hollow.

The said strands or slivers used up to this time were composed of substantially continuous glass filaments in loose untwisted parallel relationship. These filaments however did not properly and safely absorb the stresses arising in loaded ring members such as in chain links.

The main object of my invention is to increase the strength of ring members or chain links of said type. For this purpose I use according to my invention strands or slivers of glass filaments or of filaments of similar material such as quartz which comprise a core of substantially continuous filaments in loose untwisted parallel relationship and surrounding this core a mass of continuous filaments in tangled or snarled condition resembling an uncombed or shaggy strand. These strands or slivers are soaked in and impregnated with a viscous synthetic binding agent which makes the filaments stick to each other and which is capable to harden by polymerization; thereafter the thus impregnated strands or slivers are wound as filling into the hollow shells as described before to form the raw ring members or chain links. These raw members are thereupon heated to a temperature at which the polymerization is initiated say to about 90° C. While being so heated the viscosity of the impregnating and binding agent decreases reaching a minimum at say about 75° C. and becomes liquid thereby freeing the filaments, which until then were sticking together, and permitting the same to expand due to the inherent elasticity and to substantially regain their tangled or snarled condition to be finally fixed and stabilized in the hardened polymerized impregnating and binding agent; in this condition they will extend in all directions and thereby essentially increase the strength of the finished ring member or chain link.

The said and other objects of my invention will be more fully understood from the following specification when read with the accompanying drawing.

Figure 19:
Figure 20:
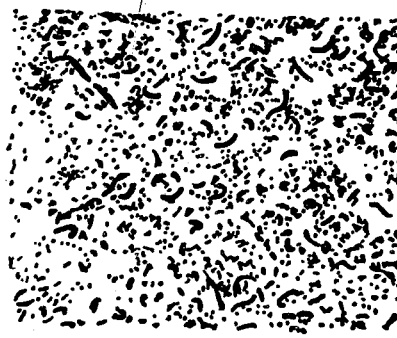
Figure 21:
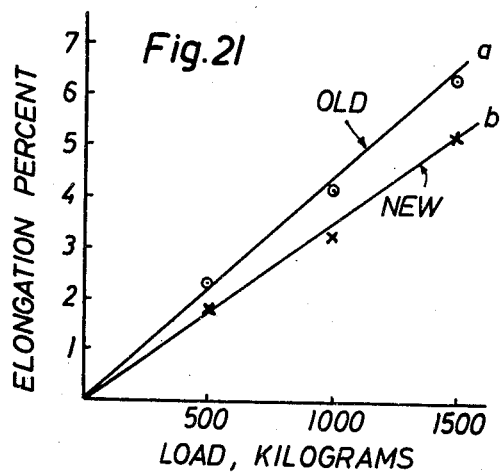

In the drawing:

FIG. 1 shows schematically a known device for the manufacture of circular chain links of the described type, FIGS. 2 and 3 show in front view ring members or chain links of other than circular shape, FIG. 4 is a partial cross sectional view of a ring member or chain link of the known type while being manufactured, FIG. 5 illustrates the cooperation of two chain links, one in being partly shown in front view and the other in cross sectional view, and indicates schematically the mechanical stresses therein when loaded, FIGS. 6 and 7 show, respectively, in a front view, partially in section, and in a side view taken on line 7—7 of FIG. 6, the two component parts forming the shell or jacket of a ring member or chain link, FIGS. 8 to 11 illustrate another embodiment of a composite shell or jacket of a ring member or chain link, FIGS. 8 and 9 showing in frontal view one of the two shell components, respectively, FIG. 10 showing in front view the assembled shell or jacket ready to receive the filament filling, and FIG. 11, illustrating in side view one component elastically deformed to be hooked into an adjoining finished ring member or chain link, FIG. 12 illustrates a strand or sliver of glass filaments as used in the known art, FIG. 13 illustrates a strand or sliver of glass filaments or the like according to my invention, FIG. 14 illustrates said filament after having been soaked in and impregnated with a synthetic polymerizable binding agent, FIG. 15 shows a partial cross sectional view of a shell into which the strand shown in FIG. 14 has been wound, FIG. 16 shows the same cross sectional view taken after polymerization of the binding agent, FIG. 17 is a diagram more particularly described hereinafter, FIG. 18 is a frontal view of the filament filling remaining after the shell and the polymerized binding agent have been removed by burning for experimental purposes, FIG. 19 is a cross sectional view thereof, FIG. 20 is an enlarged reproduction of a micro-photograph of a cross sectional surface of the filament filling in a ring or link member manufactured according to my invention, and FIG. 21 is a diagram more particularly referred to hereinafter.

The same reference numerals indicate the same elements in all figures of the drawing.

FIG. 1 illustrates schematically a known device for the manufacture of ringshaped members of the type disclosed in this application. Such members may be used either individually or as shown as chain links. A strand or sliver of continuous and substantially equally long glass filaments (or other filaments of preferably mineral origin such as quartz) in loose untwisted state as illustrated in FIG. 12 is unwound from a spool 22 rotatably mounted on frame 23 and is led over a pair of rollers 25 within a tank 24 filled with a viscous synthetic impregnating binding agent 26 capable to harden by polymerization. Such binding agents are well known and are used in the art here involved; certain improved agents of said type are fully disclosed in my copending application Serial No. 170,173, filed on January 31, 1962. The strand 21 steeped in and saturated with said binding agent 26 continues to move over two stationary guide rollers 27, 28 and the intermediately arranged stretching pulley 30 loaded by weight 29 and is wound into a rotatably mounted hollow ringshaped shell or jacket 31 (see FIG. 4) made of any suitable synthetic material and provided with a circumferentially extending inlet slit 32 to form the ringshaped member or chain link 37. The said winding of the strand 21 is effected by rotating the shell 31 into which the end of the strand was previously introduced and secured therein for example by glueing. The rotation of the shell 31 is effected by a pair of gripping rollers 34 which are driven by the electric motor 36 and the transmission drive 35.

When the strand 21 fills up the hollow of the shell or jacket 31 and possibly also the slit 32 to form the filling 33 of the ring member or link 37 the strand is cut off, the member 37 is released from the gripping rollers 34 and is either individually, or as shown forming a chain with previously identically prepared members 38, 39, etc., passed through a heating oven 40 wherein polymerization and hardening of the binding agent 26 is effected.

After the ring member 37 has been released a new shell or jacket 31 to be processed as described before is hooked thereinto. For this purpose the shell 31 is assembled from at least two parts as illustrated in FIGS. 6–11.

The shell 31, illustrated in FIG. 6 in partial sectional view in disassembled condition and in FIG. 6 in a cross view taken along line 6—6 of FIG. 7, is composed of two hollow U-shaped components 311 and 312. When assembling the shell the stepped ends 313 and 314 of the legs of each component are inserted into each other. If the shell is used in the manufacture of chains one pair of cooperating legs is passed before assembly through a previously manufactured chain link 37 shown in FIG. 6 in dotted lines.

In the embodiment shown in FIGS. 8 through 11 the hollow shell is longitudinally divided in congruent halves 315 and 316 each of which is transversely slit as indicated at 317, and 318, respectively. The halves 315 and 316 are assembled in reversed position as shown in FIG. 11 and are held together during the manufacturing operation by removable clamping means 319. FIG. 10 illustrates how the shell halves 315 and 316 are elastically deformed so that they may be coupled as a link with a previously completed link 37 shown in dotted lines. This embodiment has the advantage that the walls of the shell may be made quite thin and that two identical shell halves may be assembled.

FIG. 5 illustrates schematically the tensions and stresses arising in chain links or the like of the type described above. In loaded ring members or between engaging chain links 41, 42 arise at the point of support or contact forces F which tend to ovalize the shell body 31 as indicated by arrows $a$. Additionally at each side of said point of support or contact arise in each link bending moments identified by arrows $b$. The ring bodies or links manufactured up to this date with strands or slivers and composed of substantially equally long glass filaments in loose untwisted state as illustrated in FIG. 12, were not satisfactory because the glass filaments extended within the shell only in uniform circular direction and were unable to receive and counteract tensions and stresses acting in other directions.

To avoid the said inefficiency I use according to my invention a strand or sliver of glass filaments or the like as illustrated in FIG. 13. This strand or sliver is composed of a core of substantially continuous filaments in parallel relation which may be low in number, and surrounding said core a mass of continuous long glass filaments 45, 46, 47 in tangled or snarled condition resembling an uncombed or shaggy strand. After such strand or sliver has been passed through the impregnating binding agent 26 in tank 24, the filaments 44 through 47 stick to each other and the strand or sliver takes the compacted shape illustrated in FIG. 14. Whenever and wherever the thickness of such strand may exceed the width of the slit 32 it may be easily forced therethrough being sufficiently compressible.

FIG. 15 shows a cross sectional view of the shell or jacket 31 after an impregnated and soaked strand as shown in FIG. 14 has been wound thereinto in the above described manner to form the filling 33. The filaments of this filling sticking to each other extend substantially in unidirectional circular manner like the filaments of the hitherto used strand illustrated in FIG. 12. However, this structural condition does not remain when the ring member or link is heated in oven 40 because the impregnating mass 26 at the beginning of the heating and before being polymerized loses its viscosity so far that it becomes liquid thereby losing its capacity to act as binding agent and thus permitting the filaments of the strand to follow their inherent elasticity and to regain at least substantially their original tangled or snarled shape and relationship illustrated in FIG. 13; the cross sectional view illustrated in FIG. 15 will thus change to that shown in FIG. 16 showing circularly extending filaments 44 and irregularly transversely and obliquely running filaments 45, 46, 47.

The diagram shown in FIG. 17 illustrates the progress of the heating process in oven 40. Curve I shows the relation between time measured by minutes and the temperature T in centigrade of the heated ring members or links 37 and curve II the relation between said time and the viscosity V of the binding agent measured in cp. A working temperature in the oven $T_1 = 90°$ C. proved in most cases appropriate. The viscosity of the binding agent at room temperature will be around 1500 cp. and in the diagram is assumed to be $V_1 = 1300$ cp. After a ring member or link 37, 38, 39 etc. entered the oven 40 its temperature T will rise according to curve I and concurrently the viscosity V of the impregnating agent 26 will decrease according to curve II. When the temperature of the ring member 37 reaches about 75° C. the viscosity of the binding agent reaches its minimum of about 30 cp. At or near this point the structure of the filling 33 will change from that shown in FIG. 15 to that shown in FIG. 16. From the beginning of the positive curvature of curve II after about six minutes heating time it may be concluded that at this moment the polymerization of the binding agent begins though at first slowly because the influence of the rising temperature of said agent decreases the viscosity and will prevail. This however changes after about 42 minutes when the viscosity starts to rise as indicated by the upturning branch of curve II. Such rise of viscosity, accompanied by an increase of hardness, continues thereafter quite quickly as shown by the dotted portion of curve II and the temperature T of the impregnating agent rises above the temperature $T_1$ of the oven in view of the exothermic reaction of the polymerization process. At the end of the exothermic reaction the temperature of the binding agent reaches its highest value $T_2$ and the binding agent becomes solid and hard; thereupon its temperature decreases to the working temperature $T_1$ of the oven.

While the temperatures T in the described process may be quite well measured so that the curve I shows the changes of the temperature T substantially correctly, this is not fully true of the momentary values of viscosity V and therefore the curve II which indicates the behavior more or less only qualitatively. This is particularly true of the rising portion of curve II shown in broken line.

In order to determine the effect achieved by my invention I burned at a temperature below the melting point of glass a chain link produced as described before and thereby destroyed the shell 31 and the binding agent leaving the bare mass of glass filaments as illustrated in FIG. 18 which reproduces an actually taken photographic picture showing the distribution and structure of said mass of filaments. I also cut a chain link as shown in FIG. 16 and exposed the sectional surface to a corroding agent to remove up to a certain depth the binding agent and the shell 31 leaving exposed the bare mass of glass filaments as illustrated in FIG. 19 and as shown one hundred times enlarged in FIG. 20 which reproduces an actually taken photograph.

Measurements taken on ring member and on chains produced in accordance with my invention showed many improvements. Thus it was ascertained that under equal conditions the breaking strength of my new ring or link members is more than 20% increased this permitting to increase the load not only in the same degree but even more. While namely in the old chains of the described type the permissible load was only about 15% of the breaking load, this relation may be increased in my new chains by at least 20% because in my new ring or link members the glass filaments are more effectively dispersed and the filling 33 is not as easily detached from the shell or jacket 31.

FIG. 21 shows a diagram illustrating actual measurements on an old chain (line $a$) and on my new chain (line $b$). Both chains were composed of links whose shell 31 had a circular cross section with a diameter of 13 mm. and the links had a clearance of 36 mm. in length and 18 mm. in width, while the same epoxy resin was used as impregnating agent in each case. The breaking load of the new chain was measured to be 4880 kg. and of the old chain only 3910 kg. Each chain, before being broken, was successively loaded with 500, 1000 and 1500 kg. The diagram of FIG. 21 shows that the respective elongations were only 1.85%, 3.25% and 5.20%, respectively, in the chain produced according to my invention against 2.30%, 4.15% and 6.35%, respectively, in the old chain.

Although specific embodiments of my invention have been shown and described by way of illustration, it will be understood that many changes could be made in the application of the principles of my invention without departing from its scope as defined in the appended claims.

What I claim as my invention is:

1. A ring-shaped member or chain link comprising a hollow ring-shaped shell or jacket made from synthetic material and provided with a circumferential slit, and a filling in said shell composed of a strand or sliver of filaments of mineral origin and impregnated with a viscous binding agent hardenable by polymerization, said strand or sliver consisting of a core of straight filaments and surrounding the same of a mass of continuous filaments in tangled or snarled condition.

2. A ring-shaped member or chain link according to claim 1 wherein the filaments are glass filaments.

3. A ring-shaped member or chain link according to claim 1 wherein the filaments are quartz filaments.

References Cited in the file of this patent

UNITED STATES PATENTS

| | | |
|---|---|---|
| 1,806,733 | Bell | May 26, 1931 |
| 2,693,673 | Lutts | Nov. 9, 1954 |
| 2,707,693 | Dorst | May 3, 1955 |
| 2,979,433 | McHenry | Apr. 11, 1961 |

FOREIGN PATENTS

| | | |
|---|---|---|
| 830,567 | Great Britain | May 16, 1960 |